(12) United States Patent
Wakui et al.

(10) Patent No.: US 7,691,767 B2
(45) Date of Patent: Apr. 6, 2010

(54) CATALYTIC CRACKING CATALYST FOR HEAVY OIL AND PRODUCTION PROCESS FOR OLEFIN AND FUEL OIL

(75) Inventors: Kenichi Wakui, Chiba (JP); Kinsho Furusawa, Chiba (JP); Akio Suwa, Chiba (JP); Toshio Itoh, Chiba (JP); Hisao Nagashima, Chiba (JP)

(73) Assignees: Research Association of Refinery Integration for Group-Operation, Tokyo (JP); Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 11/623,915

(22) Filed: Jan. 17, 2007

(65) Prior Publication Data

US 2007/0170094 A1    Jul. 26, 2007

(30) Foreign Application Priority Data

Jan. 20, 2006    (JP)    ............... 2006-012967

(51) Int. Cl.
*B01J 29/00* (2006.01)
*C07C 4/02* (2006.01)
*C10G 11/00* (2006.01)

(52) U.S. Cl. ............... 502/65; 502/67; 502/71; 502/73; 502/77; 502/79; 423/21.1; 423/69; 423/700; 585/651; 585/653; 208/113; 208/114; 208/120.05; 208/120.1; 208/121

(58) Field of Classification Search ............... 585/648, 585/651, 653; 502/60, 65, 67, 71, 73, 77, 502/79, 349; 208/113, 114, 120.05, 120.1, 208/121; 423/21.1, 21.5, 69, 70

See application file for complete search history.

(56) References Cited

U.S. PATENT DOCUMENTS

| 5,358,918 A | 10/1994 | Yukang et al. | |
| 6,538,169 B1 * | 3/2003 | Pittman et al. | ............... 585/653 |
| 2006/0116544 A1 * | 6/2006 | Wakui et al. | ............... 585/653 |

FOREIGN PATENT DOCUMENTS

| JP | 6-220466 | 8/1994 |
| JP | 9-504817 | 5/1997 |
| JP | 10-60453 | 3/1998 |
| JP | 11-192431 | 7/1999 |
| JP | 2001-212462 | 8/2001 |
| JP | 2002-241764 | 8/2002 |
| JP | 2005-29620 | 2/2005 |

OTHER PUBLICATIONS

Fluid Catalytic Cracking VI, Proceedings of the 6th International Symposium on Advances in Fluid Cracking Catalysts (FCCs), New York, Sep. 7-11, 2003.
Liu et al, "Doping of rare-earth cations into Y-zeolite by solid-state ion exchange", *Gongye Cuihua Zazhishe*, 2003, 11 (8), 43-47, ISSN: 1008-1143.
Karge et al, "Solid-state ion exchange in microporous and mesoporous materials", *Molecular Sieves*, (2002), 3 (Post-Synthesis Modification I, 2002), 43-201, Accession No. 2002:277105.
Cao et al, "Rare earth exchange in small pore zeolites and its effect on their hydrothermal stability", *Studies in Surface Science and Catalysis*, 2001, 135 (Zeolites and Mesoporous Materials at the Dawn of the 21$^{st}$ Century), 1732-1739, ISSN: 0167-2991.
Nassar et al, "Ion exchange of europium3+ in Y zeolite in the solid state: influence of reaction time", *Quimica Nova*, 1998, 21(2), 121-124, ISSN: 0100-4042.
Pires et al, "Cyclohexane oxidation over rare earth exchanged zeolite Y", *Journal of Molecular Catalysis A: Chemical*, 1998, 136(1), 69-74, ISSN: 1381-1169.
Karge et al, "Preparation of bifunctional catalysts by solid-state ion exchange in zeolites, their characterization and catalytic testing", *Studies in Surface Science and Catalysis*, 1992, 73 (Prog. Catal.), 19-21, ISSN: 0167-2991.
Karge, "Modification of zeolites and new routes to ion exchange", *NATO ASI Series, Series C: Mathematical and Physical Sciences*, 1992, 352 (Zeolite Microporous Solids: Synth., Struct., React.), 273-90, ISSN: 0258-2023.
Wallenstein et al, "The dependence of SM-5 addition performance on the hydrogen-transfer activity of the REUSY base catalyst in fluid catalytic cracking", *Applied Catalysis A: General*, 214, 2001, 11-29.
H. Ishihara, "The Application of ZSM-5 Additive for FCC", *Shokubai-Kasei-Gihou*, vol. 17, 2000, pp. 15-24.

* cited by examiner

*Primary Examiner*—In Suk Bullock
(74) *Attorney, Agent, or Firm*—Oblon, Spivak, McClelland, Maier & Neustadt, L.L.P.

(57) ABSTRACT

Provided are a catalyst which inhibits light paraffins form being produced in catalytic cracking of heavy hydrocarbons and which effectively produces olefins and a process in which the above catalyst is used to produce olefins from heavy hydrocarbons at a high yield. The catalyst is a catalytic cracking catalyst for catalytically cracking a hydrocarbon raw material, comprising (A) pentasil type zeolite modified with a rare earth element and zirconium and (B) faujasite type zeolite, and the process is a production process for olefin and a fuel oil, comprising bringing a heavy oil containing 50 mass % or more of a hydrocarbon fraction having a boiling point of 180° C. or higher into contact with the catalyst described above to crack it.

9 Claims, No Drawings

CATALYTIC CRACKING CATALYST FOR HEAVY OIL AND PRODUCTION PROCESS FOR OLEFIN AND FUEL OIL

BACKGROUND OF THE INVENTION

1. Field of the Invention

The present invention relates to a catalytic cracking catalyst comprising zeolite and a production process for olefin and a fuel oil using the same, specifically to a catalytic cracking catalyst comprising pentasil type zeolite modified with a rare earth element and zirconium and faujasite type zeolite and a process for catalytically cracking a heavy oil (containing 50% or more of a hydrocarbon fraction having a boiling point of 180° C. or higher) by using the above catalytic cracking catalyst to produce olefins (particularly propylene) and a fuel oil.

2. Description of the Related Art

Light olefins, particularly propylene are an important material as a basic raw material for various chemical products. A process in which light hydrocarbon such as butane and naphtha is used as a raw material and cracked in a tubular furnace of an external heating type by heating under steam atmosphere has so far widely been carried out as a production process for light olefins. However, the above process has the economically disadvantageous points that a high temperature of 800° C. or higher is required in order to enhance an olefin yield and that this makes it inevitable to use expensive apparatus materials. Further, carried out as well is a process in which olefins such as propylene are produced as by-products together with a fuel oil from a heavy oily by fluid catalytic cracking (hereinafter abbreviated as FCC) using a zeolite catalyst. However, the problem that light paraffins having a low value are produced in larger quantities is involved therein.

A process in which a hydrocarbon fraction is catalytically cracked using a catalyst comprising Y type zeolite and pentasil type zeolite containing phosphorus, magnesium and the like to produce light olefins is disclosed in patent document 1. Examples in which a hydrocarbon fraction having a distillation range of 229 to 340° C. is catalytically cracked to produce olefins having 2 to 4 carbon atoms in a proportion of 13 to 14 mass % are described in the examples (Table 2) of the above document. In this case, however, "cracking gas" accounts for about 27 mass %, and light paraffins having a low value which are obtained by deducting an amount of olefins having 2 to 4 carbon atoms from a "cracking gas" amount are produced in as large proportion as 13 to 14 mass %.

A process in which a hydrocarbon fraction is catalytically cracked using a catalyst comprising phosphorus and rare earth-containing zeolite of a high silica content having a pentasil structure and Y type zeolite to produce light olefins is disclosed in patent document 2. Examples in which a hydrocarbon fraction having a distillation range of 243 to 507° C. is catalytically cracked to produce olefins having 2 to 4 carbon atoms in a proportion of 37.1 mass % (ethylene: 5.32 mass %, propylene: 18.31 mass %, butenes: 13.47 mass %) are described in the examples (Table 4) of the above document. In this case, "cracking gas" accounts for 49.24 mass %, and it can be found that light paraffins having a low value which are obtained by deducting an amount of olefins having 2 to 4 carbon atoms from a "cracking gas" amount are produced in a proportion of 12.14 mass %.

A process in which a hydrocarbon fraction is catalytically cracked using a catalyst comprising high silica content zeolite containing a specific amount of a rare earth element and Y type zeolites (REY, high silica Y) to produce gasoline and light olefins is disclosed in patent document 3. An example in which hydrocarbon having a boiling point of 291° C. or higher is catalytically cracked to produce 8.6 mass % of propylene and 7.28 mass % of butenes is described in the example (Table 6, Example 1) of the above document. However, a production amount of propane is 3.03 mass %, and a production amount of butanes is 10.11 mass %. Thus, a production amount of light paraffins having a low value is large as well.

Further, known as well is a catalytic cracking process which is carried out using an ordinary FCC catalyst mixed with a catalyst containing ZSM-5 type zeolite as an additive for producing olefins. A catalytic cracking process in which a physical mixture of Y type zeolite and ZSM-5 type zeolite is used as a catalyst is disclosed in patent document 4. An example in which vacuum gas oil (VGO) is catalytically cracked to produce 17.8 mass % of propylene and 13.8 mass % of butenes is described in the examples (Table 2) of the above document. However, paraffins having 2 to 4 carbon atoms account for 14.6 mass %, and a lot of light paraffins is produced.

Results obtained by catalytically cracking a heavy oil with a commercial FCC catalyst mixed with an additive containing ZSM-5 are disclosed in non-patent document 1. The production amounts of propylene and butene are 6% and 5.8% respectively (11.8% in total), and a production amount of light paraffins (dry gas+LPG−propylene−butene) other than the above is 6.2%. Thus, a production proportion (light paraffins/(dry gas+LPG)) is as high as about 34%.

An example in which butane is cracked by using pentasil type zeolite modified with a rare earth element and zirconium to produce 14 to 22 mass % of propylene is disclosed in patent document 5. However, light hydrocarbons such as butane and naphtha are assumed as the raw material, and applicability thereof to a heavy oil is not described.

Further, processes in which a heavy oil is catalytically cracked by using a fluidized bed reactor of a down flow type to produce olefin and a fuel oil are disclosed (patent documents 6, 7 and 8). However, such a large amount of a catalyst that a catalyst/raw material oil ratio (C/O ratio) is 20 to 40 is required, and an amount of light paraffins is still large (patent document 8, Table 2: propylene/propane ratio=10.5).

As described above, the existing situation is that a catalyst which inhibits light paraffins having a low value from being produced to effectively produce olefins in catalytic cracking of heavy hydrocarbons has not yet been found.

Patent document 1: Japanese Patent Application Laid-Open No. 192431/1999

Patent document 2: Japanese Patent Application Laid-Open (through PCT) No. 504817/1997

Patent document 3: U.S. Pat. No. 5,358,918

Patent document 4: Japanese Patent Application Laid-Open No. 220466/1994

Patent document 5: Japanese Patent Application Laid-Open No. 143373/2004

Patent document 6: Japanese Patent Application Laid-Open No. 60453/1998

Patent document 7: Japanese Patent Application Laid-Open No. 241764/2002

Patent document 8: Japanese Patent Application Laid-Open No. 29620/2005

Non-patent document 1: Shokubai-Kasei-Gihou, Vol. 17, p. 15 to 24, 2000

SUMMARY OF THE INVENTION

In light of the situation described above, an object of the present invention is to provide a catalyst which inhibits light paraffins from being produced to effectively produce olefins in catalytic cracking of heavy hydrocarbons and a process in which olefins are produced from heavy hydrocarbons at a high yield by using the above catalyst.

Intensive researches repeated by the present inventors in order to achieve the object described above have resulted in finding that a catalyst comprising both of pentasil type zeolite modified with a rare earth element and zirconium and faujasite type zeolite inhibits light paraffins from being produced in catalytic cracking of heavy hydrocarbons and provides a high olefin yield, and thus they have come to complete the present invention.

That is, the present invention provides:

(1) a catalytic cracking catalyst for catalytically cracking a hydrocarbon raw material, comprising (A) pentasil type zeolite modified with a rare earth element and zirconium and (B) faujasite type zeolite, (2) the catalytic cracking catalyst as described in the above item (1), wherein a proportion of the component (A) to the component (B) is 1:0.1 to 1:10 in terms of a mass ratio, (3) the catalytic cracking catalyst as described in the above item (1) or (2), wherein the total content of the component (A) and the component (B) is 5 to 50 mass % based on the whole amount of the catalyst, (4) the catalytic cracking catalyst as described in any of the above items (1) to (3), wherein a content of the rare earth element in the pentasil type zeolite modified with a rare earth element and zirconium is 0.4 to 20 in terms of an atomic ratio based on aluminum contained in the zeolite, (5) the catalytic cracking catalyst as described in any of the above items (1) to (4), wherein phosphorus is contained in the catalyst component, (6) the catalytic cracking catalyst as described in the above item (5), wherein a content of phosphorus is 0.1 to 5 mass % based on the whole amount of the catalyst, (7) the catalytic cracking catalyst as described in any of the above items (1) to (6), wherein the pentasil type zeolite is ZSM-5 and/or ZSM-11, (8) the catalytic cracking catalyst as described in any of the above items (1) to (7), wherein the faujasite type zeolite is Y type zeolite and (9) a production process for olefin and a fuel oil, comprising bringing a heavy oil containing 50 mass % or more of a hydrocarbon fraction having a boiling point of 180° C. or higher into contact with the catalyst as described in any of the above items (1) to (8) to crack it.

According to the present invention, capable of being provided is a catalyst which uses heavy hydrocarbon as a raw material to inhibit light paraffins having a low value from being produced and which can produce light olefins such as ethylene and propylene at a high yield. Use of the above catalyst cuts down a cost required for separating puffins and makes it possible to produce olefins on an economically advantageous condition which is lower by 100° C. or more as compared with a conventional thermal cracking process.

THE MOST PREFERRED EMBODIMENT TO CARRY OUT THE INVENTION

The catalyst of the present invention is a catalyst for catalytically cracking a hydrocarbon raw material, and a heavy oil containing 50 mass % or more of a hydrocarbon fraction having a boiling point of 180° C. or higher is used as the above hydrocarbon raw material. Such heavy oil includes, for example, hydrocarbon fractions such as a desulfurized light gas oil (DS-LGO), a desulfurized vacuum gas oil (DS-VGO) and a desulfurized atmospheric residual crude (DS-ARC).

The catalyst of the present invention comprises (A) pentasil type zeolite modified with a rare earth element and zirconium and (B) faujasite type zeolite, and it can contain, if necessary, other additives, for example, clay minerals and inorganic oxides. The pentasil type zeolite in the catalyst component (A) is particularly preferably ZSM-5 and/or ZSM-11, and $SiO_2/Al_2O_3$ (mole ratio) is preferably 25 to 800, more preferably 30 to 300 and further preferably 40 to 200. Any elements can be used as the rare earth element for modifying the above pentasil type zeolite, and preferably lanthanum, cerium, praseodymium, neodymium, samarium, gadolinium and dysprosium can be given. The rare earth elements each may be used alone or in a mixture of two or more kinds thereof. The catalyst can be modified with the rare earth element by an ion exchange method, an impregnation method, a hydrothermal synthesis method and other methods using various salts, for example, acetates, nitrates, halides, sulfates, carbonates, alkoxides and acetylacetonate complexes.

In the catalyst component (A), it is essential for displaying the performances of the catalyst to further add zirconium to the catalyst in addition to the rare earth element. Zirconium can be introduced into the zeolite by an ion exchange method, an impregnation method, a hydrothermal synthesis method and other methods using various zirconium compounds. The order of modification of the zeolite with the rare earth element and zirconium shall not specifically be restricted, and it is more preferably modified with the rare earth element after modified with zirconium.

It is important that the rare earth element and zirconium in the catalyst component (A) are carried on or contained in the zeolite, and the effects of the present catalyst are not obtained only by physically mixing the zeolite with the rare earth element and the compound (oxide or the like) of zirconium.

In the catalyst component (A), a content of the rare earth element is 0.4 to 20, preferably 0.6 to 5 and more preferably 0.8 to 3 in terms of an atomic ratio based aluminum contained in the zeolite in the catalyst component (A). If the above atomic ratio is 0.4 or more, paraffins which are by-products are inhibited from being produced. On the other hand, if it is 20 or less, the catalyst activity is improved, and the olefin yield is enhanced.

On the other hand, a content of zirconium is preferably 0.1 to 20, more preferably 0.5 to 10 and further preferably 1 to 5 in terms of the total mole number thereof based on the mole number of aluminum contained in the zeolite in the catalyst component (A). If the mole number of zirconium is 0.1 or more, a selectivity of the targeted product is enhanced, and if it is 20 or less, the catalyst activity is improved.

Also when the catalyst is modified only with zirconium and does not contain the rare earth element, by-products are increased, and therefore it is considered that the rare earth element and zirconium inhibit the by-products (light paraffins) from being produced by virtue of the effects of both thereof to enhance a selectivity of olefins.

Faujasite type zeolite is used as the catalyst component (B) used in combination with the catalyst component (A). Y type zeolite is preferred as the faujasite type zeolite, and REY and USY can be given as the above Y type zeolite.

In the catalyst of the present invention, a content proportion of the catalyst component (A) to the catalyst component (B) each described above is preferably 1:0.1 to 1:10, more preferably 1:0.5 to 1:2 in terms of a mass ratio from the viewpoint of the catalyst activity and the selectivity of olefin production.

Further, in the catalyst of the present invention, other additives, for example, clay minerals such as kaoline and inorganic oxides such as silica and alumina can be used, if necessary, in combination with the catalyst component (A) and the catalyst component (B) each described above. The total content of the catalyst component (A) and the catalyst component (B) each described above is preferably 5 to 50 mass %, more preferably 10 to 40 mass % and further preferably 15 to 30 mass % based on the whole amount of the catalyst from the viewpoint of the catalyst activity and the selectivity of olefin production.

The shape of the catalyst of the present invention shall not specifically be restricted, and it may be any shape such as powder and a molded product. The catalyst may contain components other than zeolite, the rare earth element and zirconium, for example, alkali metals, alkaline earth metals, transition metals, noble metals, halogen, phosphorus and a binder. It can be used in a mixture with a filler such as silica, alumina, magnesia and quartz sand. Among them, phosphorus is preferably added as the catalyst component from the viewpoint of enhancing a durability of the catalyst since it can maintain the performances of the present catalyst over a long period of time. A content of phosphorus is usually 0.1 to 5 mass % based on the whole amount of the catalyst.

Next, in the production process for olefins and a fuel oil in the present invention, a heavy oil containing 50 mass % or more of a hydrocarbon fraction having a boiling point of 180° C. or higher is brought into contact with the catalytic cracking catalyst of the present invention described above and cracked to thereby produce olefins and a fuel oil. The specific examples of the heavy oil have been explained above.

The mode of the catalytic cracking reaction in the present invention shall not specifically be restricted, and it is carried out by using a reactor of a form such as a fixed bed, a moving bed and fluidized bed and supplying a heavy oil to a catalyst layer packed with the catalyst described above. In this case, the heavy oil may be diluted with nitrogen, hydrogen, helium or steam. The reaction temperature falls in a range of 350 to 780° C., preferably 400 to 650° C. and more preferably 500 to 600° C. If it is 780° C. or lower, methane and coke are inhibited from being produced. On the other hand, if it is 350° C. or higher, the satisfactory activity is obtained, and the olefin yield per pass is increased. The reaction can be carried out at any of atmospheric pressure, reduced pressure and applied pressure, and atmospheric pressure or a little applied pressure is usually adopted.

If the process of the present invention is carried out under the conditions described above, the above heavy oil which is used as the raw material can efficiently be cracked while inhibiting light paraffins which are by-products from being produced, and not only light olefins such as propylene and butene can selectively be produced, but also a fuel oil can be produced.

EXAMPLES

The present invention shall be explained below in further details with reference to examples, but the present invention shall not be restricted to these examples.

Example 1

Powdery proton type ZSM-5 zeolite ($SiO_2/Al_2O_3$ (mole ratio)=40, specific surface area: 380 $m^2/g$) was used as the zeolite and impregnated with an aqueous solution dissolving zirconium (IV) dinitrate oxide, and moisture was vaporized while stirring under reduced pressure to obtain white powder. The powder thus obtained was dried in the air at 120° C. for 8 hours, and then it was heated up to 600° C. by taking 4 hours in a muffle furnace and calcined at 600° C. for 5 hours. The solid matter obtained was pulverized and impregnated with an aqueous solution containing rare earth chloride, and it was dried and calcined by the same operation as in carrying zirconium to obtain a white solid matter. The rare earth chloride used was a hydrate of mixed chloride of rare earths. A content of the whole rare earths was 45.5 mass % in terms of oxide, and the compositions of the rare earths in terms of oxide were $La_2O_3$: 85.5 mass %, $CeO_2$: 13.8 mass %, $Pr_6O_{11}$: 0.4 mass %, $Nd_2O_3$: 0.1 mass %, $Se_2O_3$: 0.1 mass % and $Eu_2O_3$: 0.1 mass %. The white solid matter obtained was analyzed by ICP (high frequency inductively coupled plasma) emission spectrometry to find that the contents of the rare earths (hereinafter called RE) and the amount of zirconium were 0.9 and 0.1 respectively in terms of an atomic ratio based on aluminum contained in the zeolite. The solid matter obtained was pulverized and impregnated with a diammonium hydrogenphosphate aqueous solution, and it was dried and calcined by the same operation. The solid matter thus obtained was pulverized in a mortar and allowed to pass through a sieve of 150 μm to prepare P—RE-Zr/HZSM-5 zeolite. The amounts of phosphorus, the rare earths and zirconium which were carried on the HZSM-5 zeolite were 4.0 mass %, 10.0 mass % and 7.9 mass % respectively.

Deionized water, alumina sol and silica sol were added thereto and mixed so that the compositions of this P—RE-Zr/HZSM-5 and USY zeolite ($SiO_2/Al_2O_3$ (mole ratio)=6), REY zeolite ($SiO_2/Al_2O_3$ (mole ratio)=5), kaoline, silica and alumina which were commercially available were 10.0 mass %, 11.0 mass %, 2.0 mass %, 58.3 mass %, 9.7 mass % and 9.0 mass % respectively, and the whole part thereof was turned into a slurry. This slurry was dried by spraying using a spray dryer, and the dried matter was molded into a fluidized bed type catalyst to prepare a catalyst A.

The catalyst A which was quasi-equilibrated by treating at 760° C. for 6 hours with 98% steam was used to carry out the catalytic cracking reaction of a desulfurized vacuum gas oil (specific gravity: 0.88, distillation range: 254 to 638° C., sulfur content: 0.2 mass %) at a reactor outlet temperature of 530° C., a pressure of 150 kPa, a raw material supplying amount of 1 kg/hour and a catalyst/hydrocarbon mass ratio of 7 by means of a fluidized bed bench plant reactor. The results thereof are shown in Table 1. A ratio ($C_3^=/C_3$ ratio) of propylene ($C_3^=$) to propane ($C_3$) in the resulting gas was as high as 15.7, and a proportion (($C_3^=+C_4^=)/C_1$ to $C_4$ gas) of propylene+butene ($C_4^=$) based on the whole gas having 1 to 4 carbon atoms was also a high value of 78.9%.

In Table 1, LCO means a light cycle oil and usually indicates a light gas oil produced by fluid catalytic cracking (FCC) or residual oil fluid catalytic cracking (RFCC).

Example 2

The catalyst A prepared in Example 1 was used to carry out the catalytic cracking reaction of the desulfurized vacuum gas oil on the same conditions as in Example 1, except that the reactor outlet temperature was changed to 545° C. The results thereof are shown in Table 1. As was the case with Example 1, high values were obtained in both of a propylene/propane ratio and a proportion of propylene+butene based on the whole gas having 1 to 4 carbon atoms.

Comparative Example 1

A mixed catalyst prepared by adding 10 mass % of a ZSM-5 type zeolite-containing additive (prepared by a method of Example 1 described in Japanese Patent Application Laid-Open No. 270851/2005) as a component for increasing the production of olefins to an FCC catalyst (comparative catalyst A) which was prepared by a method of a widely known document (Example 1 described in Japanese Patent Application Laid-Open No. 128121/1998) and which was quasi-equilibrated was used in place of the catalyst prepared in Example 1 to carry out the catalytic cracking reaction of the desulfurized vacuum gas oil on the same conditions as in Example 1. The results thereof are shown in Table 1. A propylene/propane ratio in the resulting gas was as low as 5.2, and a proportion of propylene+butene based on the whole gas having 1 to 4 carbon atoms was also a low value of 65.9%.

Comparative Example 2

The catalytic cracking reaction of the desulfurized vacuum gas oil was carried out on the same conditions as in Comparative Example 1, except that the reactor outlet temperature was changed to 545° C. As was the case with Comparative Example 1, both of a propylene/propane ratio and a proportion of propylene+butene based on the whole gas having 1 to 4 carbon atoms were low.

TABLE 1

| | Number | | | |
| --- | --- | --- | --- | --- |
| | Example | | Comparative Example | |
| | 1 | 2 | 1 | 2 |
| Catalyst | Catalyst A | Catalyst A | Comparative Catalyst A + ZSM-5 additive | Comparative catalyst A + ZSM-5 additive |
| Raw material | Desulfurized vacuum gas oil | Desulfurized vacuum gas oil | Desulfurized vacuum gas oil | Desulfurized vacuum gas oil |
| Temperature | 530° C. | 545° C. | 530° C. | 545° C. |
| Product yield (mass % based on the raw material) | | | | |
| Methane | 0.3 | 0.5 | 0.4 | 0.5 |
| Ethane | 0.2 | 0.3 | 0.3 | 0.4 |
| Ethylene | 1.6 | 2.0 | 1.2 | 1.6 |
| Propane ($C_3$) | 1.0 | 1.2 | 2.0 | 2.4 |
| Propylene ($C_3^=$) | 15.7 | 17.8 | 10.4 | 11.9 |
| Butanes ($C_4$) | 4.8 | 5.4 | 6.8 | 7.4 |
| Butenes ($C_4^=$) | 13.9 | 15.6 | 10.3 | 11.3 |
| Total of $C_1$ to $C_4$ gas | 37.5 | 42.8 | 31.4 | 35.5 |
| Gasoline (up to 190° C.) | 31.1 | 29.3 | 38.1 | 36.0 |
| LCO (190 to 360° C.) | 21.3 | 19.0 | 20.8 | 19.0 |
| Residual oil (higher than 360° C.) | 7.8 | 6.6 | 6.5 | 5.9 |
| Coke | 2.2 | 2.2 | 3.3 | 3.6 |
| $C_3^=/C_3$ ratio | 15.7 | 14.8 | 5.2 | 5.0 |
| $(C_3^= + C_4^=)/(C_1$ to $C_4$ gas) (%) | 78.9 | 78.0 | 65.9 | 65.4 |

(LCO: light cycle oil)

Example 3

The same catalyst (quasi-equilibrated) as used in Example 1 was used to carry out the catalytic cracking reaction of a desulfurized atmospheric residual crude (specific gravity: 0.92, distillation range: 338 to 745° C., sulfur content: 0.3 mass %) at a reactor outlet temperature of 530° C., a pressure of 150 kPa, a raw material supplying amount of 0.5 kg/hour and a catalyst/hydrocarbon mass ratio of 9 by means of a fluidized bed bench plant reactor. The results thereof are shown in Table 2. A propylene/propane ratio ($C_3^=/C_3$ ratio) in the resulting gas was as high as 17 or more, and a proportion (($C_3^=+C_4^=$)/$C_1$ to $C_4$ gas) of propylene+butene based on the whole gas having 1 to 4 carbon atoms was also a high value of about 80%.

Comparative Example 3

The catalytic cracking reaction of the desulfurized atmospheric residual crude was carried out on the same conditions as in Example 3, except that a catalyst for residual oil FCC (comparative catalyst B, prepared by a method of Example 1 described in Japanese Patent Application Laid-Open No. 212462/2001) which was quasi-equilibrated was used in place of the catalyst used in Example 3. The results thereof are shown in Table 2. A propylene/propane ratio ($C_3^=/C_3$ ratio) in the resulting gas was as low as 9.3, and a proportion (($C_3^=+C_4^=$)/$C_1$ to $C_4$ gas) of propylene+butene based on the whole gas having 1 to 4 carbon atoms was also a low value of 68.6%.

Comparative Example 4

A mixed catalyst prepared by adding 10 mass % of the same ZSM-5 type zeolite-containing additive for increasing the production of olefins as used in Comparative Example 1 to the residual oil FCC catalyst used in Comparative Example 3 which was quasi-equilibrated was used in place of the catalyst used in Example 3 to carry out the catalytic cracking reaction of the desulfurized atmospheric residual crude on the same conditions as in Example 3. The results thereof are shown in Table 2. A propylene/propane ratio in the resulting gas was 11.3, and a proportion of propylene+butene based on the whole gas having 1 to 4 carbon atoms was 70.4%. The values were low in both cases as compared with Example 3.

Comparative Example 5

A catalyst (comparative catalyst C) containing no zirconium was prepared by the same method as in Example 1, except that the carrying operation of zirconium was not carried out in the method described in Example 1.

The catalytic cracking reaction of the desulfurized atmospheric residual crude was carried out on the same conditions as in Example 3, except that the catalyst C which was quasi-equilibrated was used in place of the catalyst A. The results thereof are shown in Table 2. A propylene/propane ratio in the resulting gas was 13.3, and a proportion of propylene+butene based on the whole gas having 1 to 4 carbon atoms was 76.5%. The values were low in both cases as compared with Example 3.

TABLE 2

| | Number | | | |
|---|---|---|---|---|
| | Example | Comparative Example | | |
| | 3 | 3 | 4 | 5 |
| Catalyst | Catalyst A | Comparative catalyst B | Comparative catalyst B + ZSM-5 additive | Comparative catalyst C |
| Raw material | Desulfurized atmospheric residual crude | Desulfurized atmospheric residual crude | Desulfurized atmospheric residual crude | Desulfurized atmospheric residual crude |
| Temperature | 530° C. | 530° C. | 530° C. | 530° C. |

TABLE 2-continued

| | Number | | | |
|---|---|---|---|---|
| | Example | Comparative Example | | |
| | 3 | 3 | 4 | 5 |
| Product yield (mass % based on the raw material) | | | | |
| Methane | 0.5 | 0.5 | 0.5 | 0.5 |
| Ethane | 0.4 | 0.4 | 0.4 | 0.4 |
| Ethylene | 1.7 | 0.8 | 1.3 | 2.8 |
| Propane | 0.9 | 0.9 | 1.0 | 1.1 |
| Propylene | 15.7 | 8.4 | 11.3 | 14.6 |
| Butanes | 4.0 | 5.7 | 5.8 | 3.3 |
| Butenes | 14.2 | 9.7 | 10.1 | 11.7 |
| Total of $C_1$ to $C_4$ gas | 37.4 | 26.4 | 30.4 | 34.4 |
| Gasoline (up to 190° C.) | 24.1 | 36.6 | 31.6 | 22.9 |
| LCO (190 to 360° C.) | 22.0 | 22.3 | 22.9 | 23.6 |
| Residual oil (higher than 360° C.) | 10.2 | 7.0 | 7.4 | 14.1 |
| Coke | 6.3 | 7.8 | 7.6 | 5.0 |
| $C_3^=/C_3$ ratio | 17.4 | 9.3 | 11.3 | 13.3 |
| ($C_3^= + C_4^=$)/ ($C_1$ to $C_4$ gas) (%) | 80.0 | 68.6 | 70.4 | 76.5 |

Example 4

The catalytic cracking reaction of the desulfurized atmospheric residual crude was carried out on the same conditions as in Example 3, except that the reactor outlet temperature was changed to 545° C. The results thereof are shown in Table 3. As was the case with Example 3, high values were obtained in both of a propylene/propane ratio and a proportion of propylene+butene based on the whole gas having 1 to 4 carbon atoms.

Comparative Examples 6 to 8

The catalytic cracking reaction of the desulfurized atmospheric residual crude was carried out on the same conditions as in Example 4, except that in place of the catalyst A, the residual oil FCC catalyst used in Comparative Example 3 which was quasi-equilibrated was used in Comparative Example 6; a mixed catalyst prepared by adding 10 mass % of the ZSM-5 type zeolite-containing additive for increasing the production of olefins used in Comparative Example 1 to the residual oil FCC catalyst described above which was quasi-equilibrated was used in Comparative Example 7; and the comparative catalyst C prepared in Comparative Example 5 was used in Comparative Example 8. The results thereof are shown in Table 3. A propylene/propane ratio and a proportion of propylene+butene based on the whole gas having 1 to 4 carbon atoms were low in any of the cases as compared with Example 4.

TABLE 3

| | Number | | | |
|---|---|---|---|---|
| | Example | Comparative Example | | |
| | 4 | 6 | 7 | 8 |
| Catalyst | Catalyst A | Comparative catalyst B | Comparative catalyst B + ZSM-5 additive | Comparative catalyst C |
| Raw material | Desulfurized atmospheric residual crude | Desulfurized atmospheric residual crude | Desulfurized atmospheric residual crude | Desulfurized atmospheric residual crude |
| Temperature | 545° C. | 545° C. | 545° C. | 545° C. |
| Product yield (mass % based on the raw material) | | | | |
| Methane | 0.6 | 0.7 | 0.6 | 0.7 |
| Ethane | 0.5 | 0.5 | 0.5 | 0.5 |
| Ethylene | 2.1 | 1.1 | 1.6 | 3.6 |
| Propane | 1.0 | 1.1 | 1.2 | 1.2 |
| Propylene | 17.5 | 9.9 | 12.9 | 17.1 |
| Butanes | 3.7 | 6.3 | 6.5 | 3.5 |
| Butenes | 15.7 | 10.9 | 11.6 | 13.5 |
| Total of $C_1$ to $C_4$ gas | 41.1 | 30.5 | 34.9 | 40.1 |
| Gasoline (up to 190° C.) | 23.2 | 34.1 | 30.2 | 23.3 |
| LCO (190 to 360° C.) | 20.1 | 21.0 | 20.5 | 19.9 |
| Residual oil (higher than 360° C.) | 9.3 | 6.1 | 6.4 | 11.4 |
| Coke | 6.2 | 8.3 | 7.9 | 5.3 |
| $C_3^=/C_3$ ratio | 17.5 | 9.0 | 10.8 | 14.3 |
| $(C_3^= + C_4^=)/(C_1$ to $C_4$ gas) (%) | 80.0 | 68.2 | 70.2 | 76.3 |

TABLE 4

| | Number | |
|---|---|---|
| | Example 5 | Comparative Example 9 |
| Catalyst | Catalyst A | Comparative catalyst D |
| Raw material | Desulfurized vacuum gas oil | Desulfurized vacuum gas oil |
| Temperature | 550° C. | 550° C. |
| Conversion rate (%) | 84.1 | 35.3 |
| Yield (mass % based on the raw material) | | |
| Dry gas | 1.8 | 1.5 |
| Propylene + butene | 15.3 | 7.8 |
| Gasoline | 34.1 | 7.2 |
| LCO | 26.5 | 17.1 |
| Residual oil | 15.9 | 64.7 |
| Coke | 1.6 | 6.5 |

(Conversion rate = 100 − residual oil, dry gas = ($H_2$) + ($C_1$ to $C_2$ hydrocarbon gas))

Example 5 and Comparative Example 9

P—RE-Zr/HZSM-5 zeolite modified with a rare earth element and zirconium was prepared by the same method as in Example 1. Deionized water, alumina sol and silica sol were added thereto and mixed so that the compositions of this P—RE-Zr/HZSM-5 zeolite, kaoline, silica and alumina were 25 mass %, 49 mass %, 19 mass % and 7 mass % respectively, and the whole part thereof was turned into a slurry. This slurry was dried by spraying using a spray dryer, and the dried matter was molded into a fluidized bed type catalyst containing no Y type zeolite to obtain a comparative catalyst D.

The catalyst prepared in Example 1 and the comparative catalyst D obtained above (both were quasi-equilibrated) were used to carry out the catalytic cracking reaction of a desulfurized vacuum gas oil at a reactor outlet temperature of 550° C. and a catalyst/hydrocarbon mass ratio of 4 by means of a micro activity test equipment (MAT equipment). The results thereof are shown in Table 4. Heavy hydrocarbon was not cracked so much on the same conditions with the catalyst (Comparative Example 9) containing no Y type zeolite as compared with Example 5, and a production amount of propylene+butene was low.

What is claimed is:

1. A catalytic cracking catalyst for catalytically cracking a hydrocarbon raw material, comprising:
    (A) a pentasil zeolite modified with a rare earth element and zirconium; and
    (B) a faujasite zeolite;
    wherein:
    the rare earth element comprises at least one member selected from the group consisting of lanthanum, cerium, praseodymium, neodymium, samarium, gadolinium, dysprosium and europium; and
    a mass ratio of component (A) to component (B) is from 1:0.5 to 1:2.

2. The catalytic cracking catalyst as described in claim 1, wherein the total content of the component (A) and the component (B) is 5 to 50 mass % based on the whole amount of the catalyst.

3. The catalytic cracking catalyst as described in claim 1, wherein a content of the rare earth element in the pentasil zeolite modified with a rare earth element and zirconium is 0.4 to 20 in terms of an atomic ratio based on aluminum contained in the zeolite.

4. The catalytic cracking catalyst as described in claim 1, wherein the catalyst component comprises phosphorus.

5. The catalytic cracking catalyst as described in claim 4, wherein a content of phosphorus is 0.1 to 5 mass % based on the whole amount of the catalyst.

6. The catalytic cracking catalyst as described in claim 1, wherein the pentasil zeolite is ZSM-5 and/or ZSM-11.

7. The catalytic cracking catalyst as described in claim 1, wherein the faujasite zeolite is Y type zeolite.

8. A production process for olefin and a fuel oil, comprising bringing a heavy oil containing 50 mass % or more of a hydrocarbon fraction having a boiling point of 180° C. or higher into contact with the catalyst as described in claim 1 to crack it.

9. The catalytic cracking catalyst as described in claim 1, wherein a content of zirconium in the pentasil zeolite modified with a rare earth element and zirconium is from 0.1 to 20 moles per mole of aluminum in the zeolite in the in the catalyst component (A).

* * * * *